(12) United States Patent
Seki et al.

(10) Patent No.: US 11,209,829 B2
(45) Date of Patent: Dec. 28, 2021

(54) TRACKING VEHICLE CONTROL SYSTEM (71) Applicant: KABUSHIKI KAISHA TOYOTA JIDOSHOKKI, Kariya (JP)

(72) Inventors: Satoshi Seki, Aichi-ken (JP); Taro Kassai, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 250 days.

(21) Appl. No.: 16/428,074

(22) Filed: May 31, 2019

(65) Prior Publication Data

US 2019/0369630 A1   Dec. 5, 2019

(30) Foreign Application Priority Data

Jun. 5, 2018 (JP) .............................. JP2018-107500

(51) Int. Cl.
*G05D 1/02* (2020.01)
*G06K 9/00* (2006.01)
*G01S 17/88* (2006.01)
*G01S 7/48* (2006.01)

(52) U.S. Cl.
CPC .......... *G05D 1/0231* (2013.01); *G01S 7/4808* (2013.01); *G01S 17/88* (2013.01); *G06K 9/00791* (2013.01); *G05D 2201/0216* (2013.01)

(58) Field of Classification Search
CPC .......... G05D 1/0231; G05D 2201/0216; G01S 7/4808; G01S 17/88; G06K 9/00791
See application file for complete search history.

(56) References Cited

U.S. PATENT DOCUMENTS

2017/0285868 A1*  10/2017  Gan ...................... G09G 5/003

FOREIGN PATENT DOCUMENTS

| EP | 2590041 A2 | 5/2013 |
|----|------------|--------|
| EP | 2590041 A3 | 1/2014 |
| JP | 6-214642 A | 8/1994 |
| JP | H06214642 A | 8/1994 |

(Continued)

OTHER PUBLICATIONS

Machine Translation of JP2006155349 (Year: 2006).*
Communication dated Oct. 11, 2019, from the European Patent Office in counterpart European Application No. 19177165.8.

*Primary Examiner* — Anne Marie Antonucci
*Assistant Examiner* — Sahar Motazedi
(74) *Attorney, Agent, or Firm* — Sughrue Mion, PLLC (57) ABSTRACT

A tracking vehicle control system includes a drive section, a drive control section, a recognition section, a first judgement section, and a second judgement section. After the drive control section controls the drive section to get a tracking vehicle to track a tracking object according to a result of recognition of the tracking object performed by the recognition section, the drive control section controls the drive section to stop the tracking vehicle from tracking the tracking object when the first judgement section judges that the tracking object has started access to the tracking vehicle. The drive control section controls the drive section to get the tracking vehicle to restart tracking the tracking object when the second judgement section judges that the tracking object has ended access to the tracking vehicle. The recognition section recognizes the tracking object even when tracking of the tracking object by the tracking vehicle is suspended.

6 Claims, 6 Drawing Sheets

(56) References Cited

FOREIGN PATENT DOCUMENTS

| | | |
|---|---|---|
| JP | 2006-134221 A | 5/2006 |
| JP | 2006-155349 A | 6/2006 |
| JP | 2008-191800 A | 8/2008 |

\* cited by examiner

TRACKING VEHICLE CONTROL SYSTEM

CROSS-REFERENCE TO RELATED APPLICATION

This application claims priority to Japanese Patent Application No. 2018-107500 filed on Jun. 5, 2018, the entire disclosure of which is incorporated herein by reference.

BACKGROUND ART

The present disclosure relates to a tracking vehicle control system.

A known tracking vehicle control system is disclosed, for example, in Japanese Patent Application Publication No. 2006-134221. This tracking vehicle control system includes a moving object detecting section, an environment recognition section, a parameter setting section, a tracking distance control section, and a movement control section. The moving object detecting section is configured to detect a target moving object to be tracked by a tracking device. The environment recognition section is configured to recognize the environment surrounding the tracking device. The parameter setting section is configured to set parameters that are specified by a user. The tracking distance control section is configured to control a tracking distance between the moving object and the tracking device according to the environment information recognized by the environment recognition section and the parameter values set by the parameter setting section. The movement control section is configured to control the movement of the tracking device according to information on the moving object detected by the moving object detecting section, the tracking distance input by the tracking distance control section, the environment information, and the parameter values.

The above described disclosure; however, has a problem. That is, when the tracking device serves as a picking cart used for picking operation in a logistics facility, the moving object (i.e., a tracking object) finely moves back and forth and around in a certain area for picking up items from shelves and loading the items into the tracking vehicle. In this case, the tracking vehicle has to keep moving for tracking the tracking object that is moving finely, so that the tracking object has difficulty in access to the moving tracking vehicle. To solve this problem, the tracking vehicle is required to stop temporarily. However, if tracking of the tracking object is once canceled to stop the tracking vehicle, the tracking object has to approach the tracking vehicle for recognition of the tracking object to get the tracking vehicle to restart tracking of the tracking object without false recognition of the tracking object.

The present disclosure, which has been made in light of the above-described problem, is directed to providing a tracking vehicle control system that is configured to stop a tracking vehicle from tracking a tracking object when the tracking object accesses the tracking vehicle, and the tracking vehicle control system is also configured to allow the tracking vehicle to restart tracking the tracking object without the tracking object approaching the tracking vehicle.

SUMMARY

In accordance with an aspect of the present disclosure, there is provided a tracking vehicle control system for controlling a tracking vehicle that tracks a tracking object includes a drive section, a drive control section, a recognition section, a first judgement section, and a second judgement section. The drive section is configured to drive the tracking vehicle. The drive control section is configured to control the drive section. The recognition section is configured to recognize the tracking object. The first judgement section is configured to judge whether the tracking object has started access to the tracking vehicle. The second judgement section is configured to judge whether the tracking object has ended access to the tracking vehicle. After the drive control section controls the drive section to get the tracking vehicle to track the tracking object according to a result of recognition of the tracking object performed by the recognition section, the drive control section controls the drive section to stop the tracking vehicle from tracking the tracking object when the first judgement section judges that the tracking object has started access to the tracking vehicle. The drive control section controls the drive section to get the tracking vehicle to restart tracking the tracking object when the second judgement section judges that the tracking object has ended access to the tracking vehicle. The recognition section recognizes the tracking object even when tracking of the tracking object by the tracking vehicle is suspended.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure together with objects and advantages thereof, may best be understood by reference to the following description of the embodiments together with the accompanying drawings in which.

DETAILED DESCRIPTION OF THE EMBODIMENTS

Hereinafter, an embodiment of the present disclosure will be described with reference to the drawings.

Figure 1:
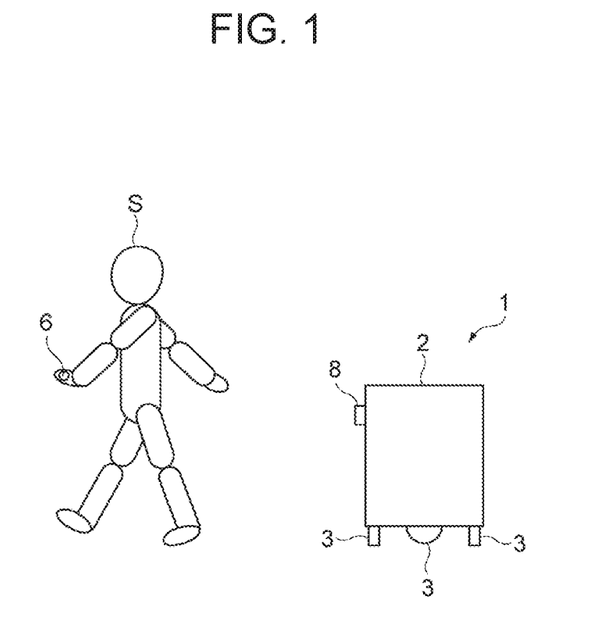
FIG. 1 is a schematic side view of a tracking object and a tracking vehicle, the tracking vehicle including a tracking vehicle control system according to an embodiment of the present disclosure.

FIG. 1 is a schematic side view of a tracking object and a tracking vehicle, and the tracking vehicle includes a tracking vehicle control system according to an embodiment of the present disclosure. In FIG. 1, a tracking vehicle 1 serves as a picking cart used for picking operation performed in a logistics facility, and is configured to track an operator S (i.e., a tracking object). The tracking vehicle 1 includes a vehicle body 2, four wheels 3 rotatably supported by the vehicle body 2, and a service brake 4 (FIG. 2) configured to apply a brake on the wheels 3. The tracking vehicle 1 is an omnidirectional mobile cart that is movable back and forth and around. The operator S picks up items from shelves 14 (see FIG. 4) in a warehouse and loads the items into the vehicle body 2 of the tracking vehicle 1.

Figure 2:
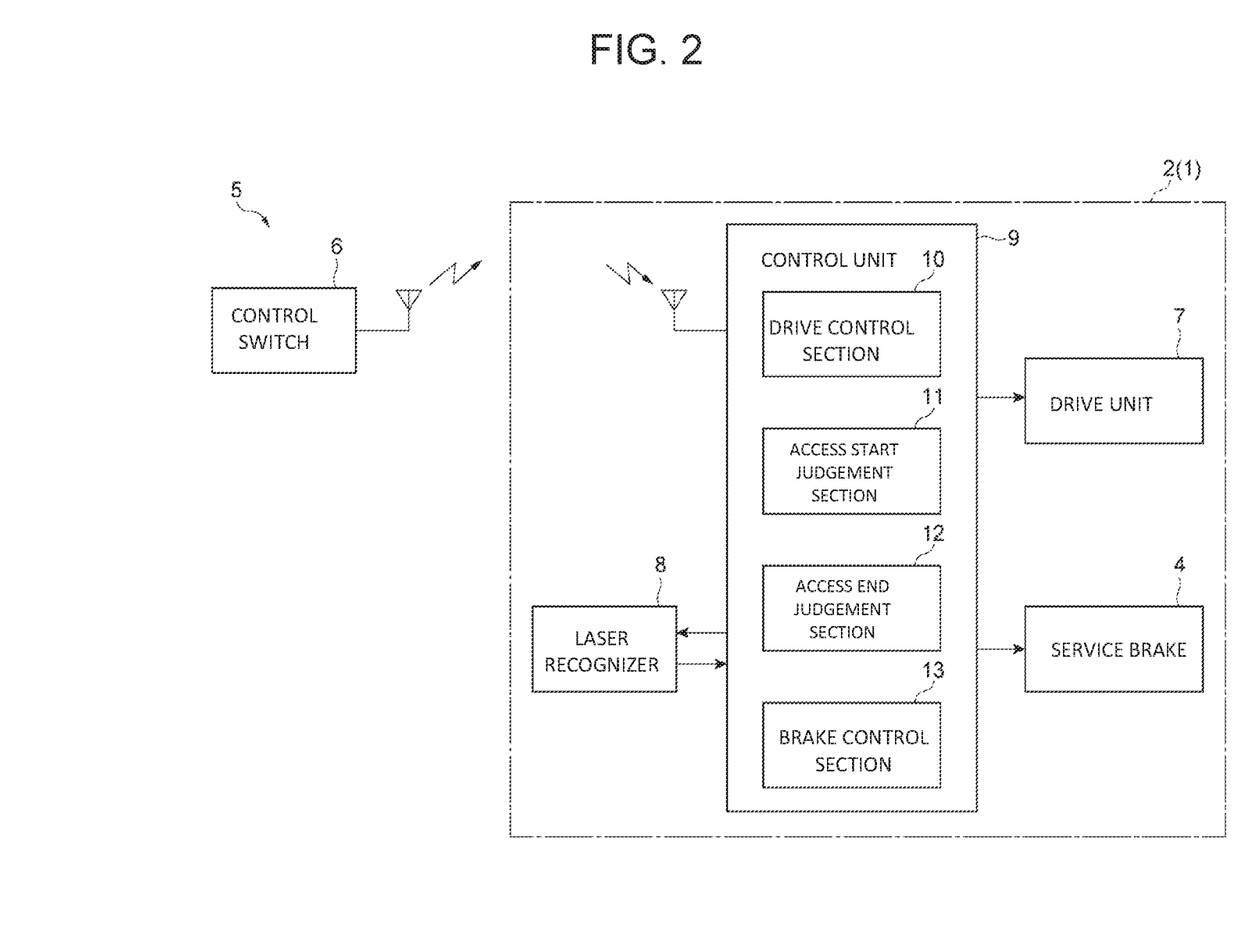
FIG. 2 is a configuration diagram of the tracking vehicle control system according to the embodiment of the present disclosure.

FIG. 2 is a configuration diagram of the tracking vehicle control system according to the embodiment of the present disclosure. A tracking vehicle control system 5 of the present embodiment illustrated in FIG. 2 is a system that is configured to control the tracking vehicle 1. The tracking vehicle control system 5 includes a control switch 6 accompanied by the operator S, a drive unit 7 mounted to the vehicle body 2 of the tracking vehicle 1, a laser recognizer 8, and a control unit 9. The control switch 6 is connected wirelessly to the control unit 9.

The control switch 6 is a switch for instructing the tracking vehicle 1 to start and end tracking the operator S. The control switch 6 is a switch such as a push-button switch or a voice switch.

The drive unit 7 serves as a drive section that is configured to drive the tracking vehicle 1. The drive unit 7, for example, includes a motor that drives the wheels 3.

The laser recognizer 8 serves as a recognition section that is configured to recognize the operator S. More specifically, the laser recognizer 8 irradiates the operator S with a laser to recognize the operator S by the laser reflection. The laser recognizer 8 starts constant recognition of the operator S by the instruction for starting tracking the operator S provided from the operator S with the control switch 6. That is, once the tracking vehicle 1 is instructed to start tracking the operator S by the control switch 6, the laser recognizer 8 recognizes the operator S even when tracking of the operator S by the tracking vehicle 1 is suspended.

The tracking vehicle control system 5 further includes, more specifically, the control unit 9 of the tracking vehicle control system 5 includes a drive control section 10, an access start judgement section 11 (a first judgement section), an access end judgement section 12 (a second judgement section), and a brake control section 13. The control unit 9 further includes a CPU, a RAM, a ROM, and an input-output interface.

The drive control section 10 is configured to control the drive unit 7 to get the tracking vehicle 1 to track the operator 5, according to an instruction signal provided by the control switch 6 and a detection signal provided by the laser recognizer 8 (a result of recognition of the operator S performed by the laser recognizer 8). The access start judgement section 11 is configured to judge, according to the detection signal from the laser recognizer 8, whether the operator S has started access to the tracking vehicle 1. The access end judgement section 12 is configured to judge, according to the detection signal from the laser recognizer 8, whether the operator S has ended access to the tracking vehicle 1. The brake control section 13 is configured to release the service brake 4 when tracking of the operator S by the tracking vehicle 1 is suspended.

Figure 3:
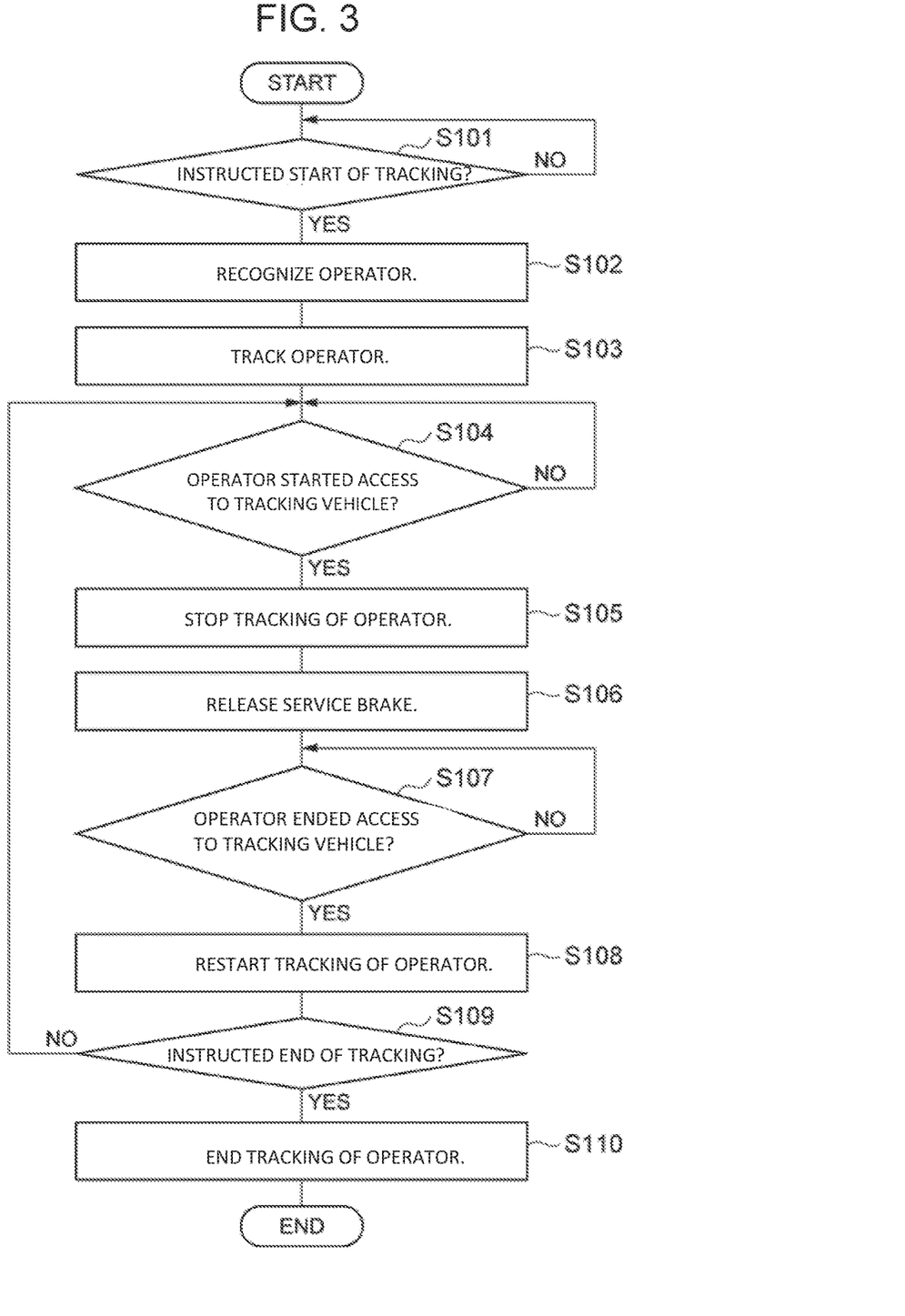
FIG. 3 is a flow chart of the processing performed by a control unit illustrated in FIG. 1.
Figure 4:
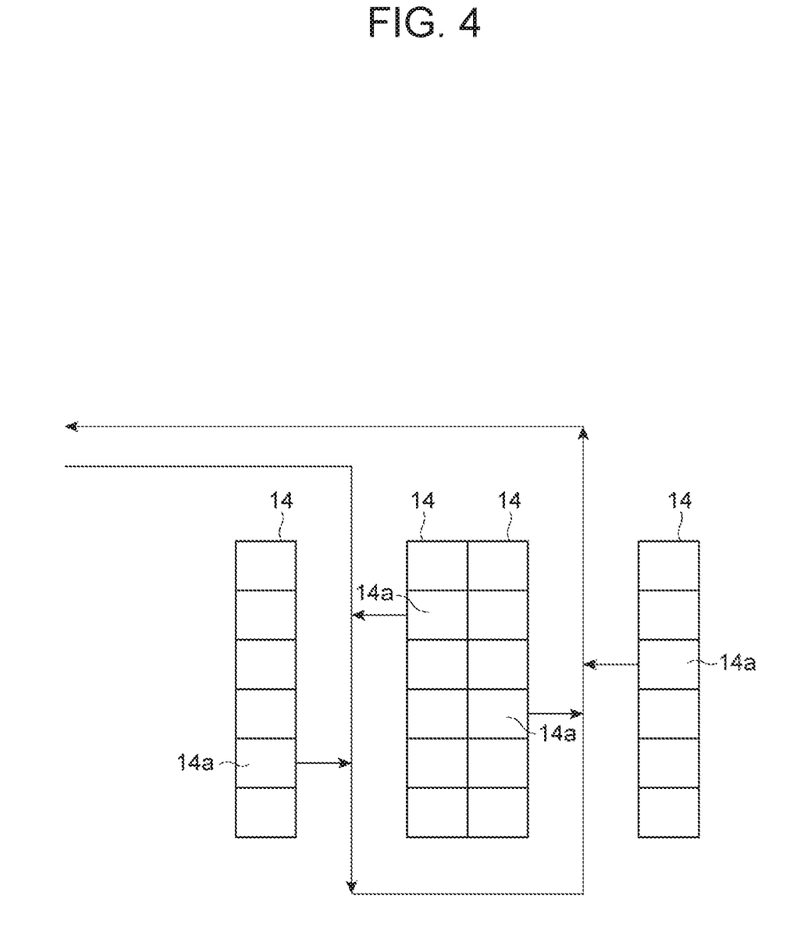
FIG. 4 is a conceptual diagram of an exemplary moving route of a picking operator and the tracking vehicle for picking operation.

FIG. 3 is a flow chart of the processing performed by the control unit 9. This processing is executed in picking operation performed by the operator S, which is illustrated in FIG. 4. In picking operation, the operator S picks up an item from a shelf 14a of the shelves 14, and places the item on the vehicle body 2 of the tracking vehicle 1. Then, the operator S moves from the shelves 14 to the different shelves 14 to repeat pickup. Since the tracking vehicle 1 tracks the operator S with the items placed on the vehicle body 2, the items are carried by the tracking vehicle 1 with the movement of the operator S.

As illustrated in FIG. 3, the control unit 9 judges whether the tracking vehicle 1 has been instructed via the control switch 6 to start tracking the operator S (step S101). When the control unit 9 judges that the tracking vehicle 1 has been instructed to start tracking the operator S, the control unit 9 controls the laser recognizer 8 to irradiate the operator S with a laser to recognize the operator S (step S102). The control unit 9 (i.e., the drive control section 10) controls the drive unit 7, according to the detection signal from the laser recognizer 8, to get the tracking vehicle 1 to track the operator S (step S103). Accordingly, the tracking vehicle 1 tracks the operator S.

The control unit 9 (i.e., the access start judgement section 11) then judges, according to the detection signal from the laser recognizer 8, whether the operator S has started access to the tracking vehicle 1 (step S104) to place an item on the vehicle body 2 of the tracking vehicle 1.

When the control unit 9 (i.e., the access start judgement section 11) judges that the operator S has started access to the tracking vehicle 1, the control unit 9 (i.e., the drive control section 10) controls the drive unit 7 to stop the tracking vehicle 1 from tracking the operator S (step S105), thereby causing the tracking vehicle 1 to stop tracking the operator S temporarily. While the tracking of the operator S by the tracking vehicle 1 is suspended, the laser recognizer 8 keeps recognizing the operator S. The control unit 9 (i.e., the brake control section 13) then releases the service brake 4 (step S106). This releases the brake on the wheels 3.

Subsequently, the control unit 9 (i.e., the access end judgement section 12) judges, according to the detection signal from the laser recognizer 8, whether the operator S has ended access to the tracking vehicle 1 (step S107). When the control unit 9 (i.e., the access end judgement section 12) judges that the operator S has ended access to the tracking vehicle 1, the control unit 9 (the drive control section 10) controls the drive unit 7 to get the tracking vehicle 1 to restart tracking the operator S (step S108). Accordingly, the tracking vehicle 1 restarts tracking the operator S.

The control unit 9 judges whether the tracking vehicle 1 has been instructed via the control switch 6 to end tracking of the operator S (step S109). When the control unit 9 judges that the tracking vehicle 1 has not been instructed to end tracking of the operator S, the control unit 9 (i.e., the access start judgement section 11) executes step S104 again. When the control unit 9 judges that the tracking vehicle 1 has been instructed to end tracking of the operator 5, the control unit 9 controls the drive unit 7 to get the tracking vehicle 1 to end tracking of the operator S (step S110). Accordingly, the tracking vehicle 1 ends tracking of the operator S.

Figure 5:
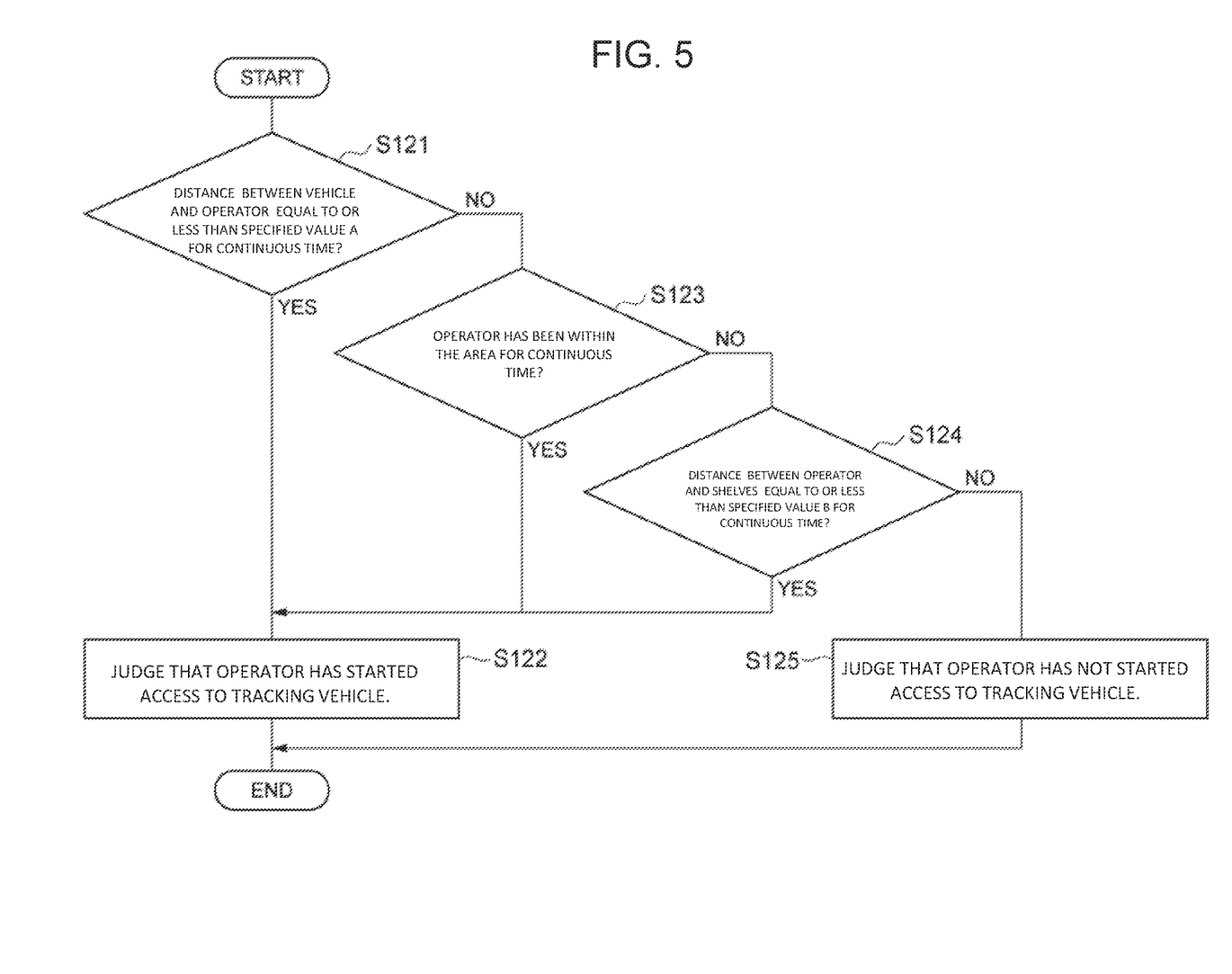
FIG. 5 is a flow chart of the processing performed at step S104 shown in FIG. 3.

FIG. 5 is a flow chart of the processing performed at step S104, in other words, FIG. 5 is a flow chart of the processing performed to judge whether the operator S has started access to the tracking vehicle 1.

As illustrated in FIG. 5, the control unit 9 (i.e., the access start judgement section 11) judges, according to the detection signal from the laser recognizer 8, whether a distance between the tracking vehicle 1 and the operator S has been equal to or less than a specified value A for a predetermined continuous time (step S121). The specified value A is a value specified for suspension of tracking. When the control unit 9 (i.e., the access start judgement section 11) judges that the distance between the tracking vehicle 1 and the operator S has been equal to or less than the specified value A for the predetermined continuous time, the control unit 9 (i.e., the access start judgement section 11) judges that the operator S has started access to the tracking vehicle 1 (step S122).

When the control unit 9 (i.e., the access start judgement section 11) judges that the distance between the tracking vehicle 1 and the operator S has not been equal to or less than the specified value A for the predetermined continuous time, the control unit 9 (i.e., the access start judgement section 11) judges, according to a detection signal from the laser recognizer 8, whether the operator S has been within a predetermined area for a predetermined continuous time (step S123). The predetermined area herein refers to an area where the operator S performs picking operation. When the control unit 9 (i.e., the access start judgement section 11) judges that the operator S has been within a predetermined area for the predetermined continuous time, the control unit 9 (i.e., the access start judgement section 11) judges that the operator S has started access to the tracking vehicle 1 (step S122).

When the control unit 9 (i.e., the access start judgement section 11) judges that the operator S has not been within a predetermined area for the predetermined continuous time, the control unit 9 (i.e., the access start judgement section 11) judges, according to a detection signal from the laser recognizer 8, whether a distance between the operator S and the shelves 14 has been equal to or less than a specified value B for a predetermined continuous time (step S124). The specified value B is a value specified for suspension of tracking. When the control unit 9 (i.e., the access start judgement section 11) judges that the distance between the operator S and the shelves 14 has been equal to or less than the specified value B for the predetermined continuous time, the control unit 9 (i.e., the access start judgement section 11) judges that the operator S has started access to the tracking vehicle 1 (step S122).

When the control unit 9 (i.e., the access start judgement section 11) judges that the distance between the operator S and the shelves 14 has not been equal to or less than the specified value B for the predetermined continuous time, the control unit 9 (i.e., the access start judgement section 11) judges that the operator S has not started access to the tracking vehicle 1 (step S125).

The continuous time and the specified value A at step S121, the continuous time and dimensions of the picking area at step S123, and the continuous time and the specified value B at step S124 may be changed according to conditions such as characteristics of the operator S, location, and time.

Figure 6:
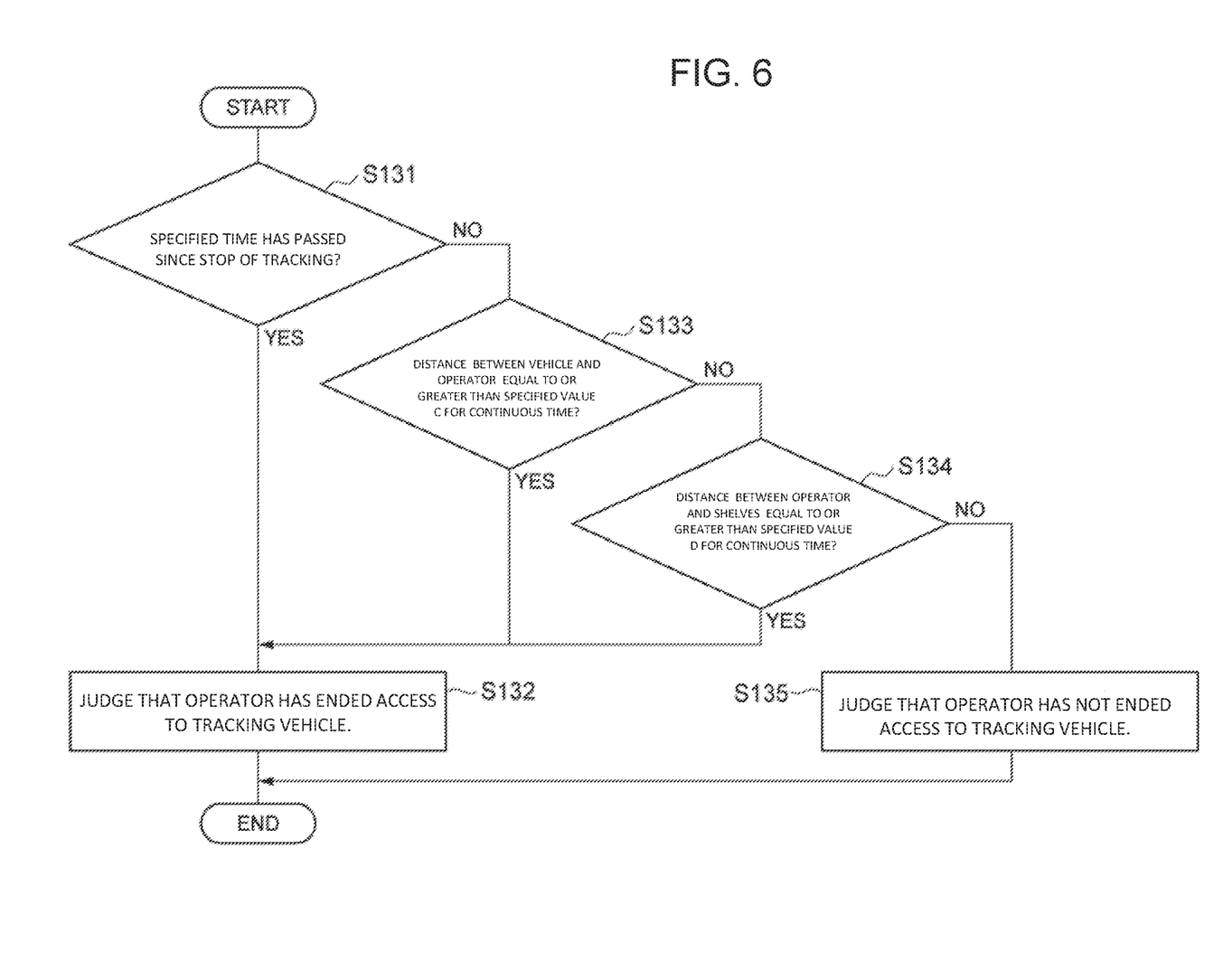
FIG. 6 is a flow chart of the processing performed at step S107 shown in FIG. 3.

FIG. 6 is a flow chart of the processing performed at step S107, in other words, FIG. 6 is a flow chart of the processing performed to judge whether the operator S has ended access to the tracking vehicle 1.

As illustrated in FIG. 6, the control unit 9 (i.e., the access end judgement section 12) judges (step S131) whether a specified time has passed since the tracking vehicle 1 stopped tracking the operator S at step S105. When the control unit 9 (i.e., the access end judgement section 12) judges that the specified time has passed since the tracking vehicle 1 stopped tracking the operator S, the control unit 9 (i.e., the access end judgement section 12) judges that the operator S has ended access to the tracking vehicle 1 (step S132).

When the control unit 9 (i.e., the access end judgement section 12) judges that the specified time has not passed since the tracking vehicle 1 stopped tracking the operator S, the control unit 9 (i.e., the access end judgement section 12) judges, according to a detection signal from the laser recognizer 8, whether a distance between the tracking vehicle 1 and the operator S has been equal to or greater than a specified value C for a predetermined continuous time (step S133). The specified value C is a value specified for restart of tracking, and is, for example, greater than the specified value A. When the control unit 9 (i.e., the access end judgement section 12) judges that the distance between the tracking vehicle 1 and the operator S has been equal to or greater than the specified value C for the predetermined continuous time, the control unit 9 (i.e., the access end judgement section 12) judges that the operator S has ended access to the tracking vehicle 1 (step S132).

When the control unit 9 (i.e., the access end judgement section 12) judges that the distance between the tracking vehicle 1 and the operator S has not been equal to or greater than the specified value C for the predetermined continuous time, the control unit 9 (i.e., the access end judgement section 12) judges, according to the detection signal from the laser recognizer 8, whether the distance between the operator S and the shelves 14 has been equal to or greater than a specified value D for a predetermined continuous time (step S134). The specified value D is a value specified for restart of tracking, and is, for example, greater than the specified value B. When the control unit 9 (i.e., the access end judgement section 12) judges that the distance between the operator S and the shelves 14 has been equal to or greater than the specified value D for the predetermined continuous time, the control unit 9 (i.e., the access end judgement section 12) judges that the operator S has ended access to the tracking vehicle 1 (step S132).

When the control unit 9 (i.e., the access end judgement section 12) judges that the distance between the operator S and the shelves 14 has not been equal to or greater than the specified value D for the predetermined continuous time, the control unit 9 (i.e., the access end judgement section 12) judges that the operator S has not ended access to the tracking vehicle 1 (step S135).

The specified time at step S131 may be changed according to conditions provided from a host computer, such as a picking list, characteristics of the operator S, location, and time. The continuous time and the specified value C at step S133, and the continuous time and the specified value D at step S134 may be changed according to conditions such as characteristics of the operator 5, location, and time.

The drive control section 10 executes steps S101 to S103, S105, and S108 to S110. The access start judgement section 11 executes step S104. The access end judgement section 12 executes step S107. The brake control section 13 executes step S106.

In this embodiment, as described above, when the control unit 9 (i.e., the access start judgement section 11) judges that the operator S has started access to the tracking vehicle 1, the control unit 9 (i.e., the drive control section 10) controls the drive unit 7 to stop the tracking vehicle 1 from tracking the operator S. This causes the tracking vehicle 1 to stop tracking the operator S automatically. This allows the tracking vehicle 1 to stop tracking the operator S even when the operator S accesses the tracking vehicle 1 in a narrow area, thereby preventing the tracking vehicle 1 from blocking the passage of operators. When the control unit 9 (i.e., the access end judgement section 12) judges that the operator S has ended access to the tracking vehicle 1, the control unit 9 (i.e., the drive control section 10) controls the drive unit 7 to get the tracking vehicle 1 to restart tracking the operator S. This causes the tracking vehicle 1 to restart tracking the operator S automatically. This allows the laser recognizer 8 to recognize the operator S even when tracking of the operator S by the tracking vehicle 1 is suspended. Accordingly, this allows the tracking vehicle 1 to restart tracking the operator S without requiring the operator S to approach the tracking vehicle 1 for prevention of false recognition of the operator S.

For access to the tracking vehicle 1, the operator S approaches the tracking vehicle 1. In this embodiment, the control unit 9 (i.e., the access start judgement section 11) judges whether the distance between the tracking vehicle 1 and the operator S has been equal to or less than the specified value A for a predetermined continuous time, and this judgement result enables the control unit 9 to reliably judge whether the operator S has started access to the tracking vehicle 1.

For access to the tracking vehicle 1, the operator S is in a vicinity of the tracking vehicle 1. In this embodiment, the control unit 9 (i.e., the access start judgement section 11) judges whether the operator S has been within a predetermined area for a predetermined continuous time, and this judgement result enables the control unit 9 to reliably judge whether the operator S has started access to the tracking vehicle 1.

The operator S approaches the shelves 14 to pick up items from the shelves 14 and then accesses the tracking vehicle 1 to load the items into the tracking vehicle 1. In this embodiment, the control unit 9 (i.e., the access start judgement section 11) judges whether the distance between the operator S and the shelves 14 has been equal to or less than the specified value B for the predetermined continuous time, and this judgment result enables the control unit 9 to reliably judge whether the operator S has started access to the tracking vehicle 1.

The operator S ends access to the tracking vehicle 1 when a specified time has passed since the tracking vehicle 1 stopped tracking the operator S. In this embodiment, the control unit 9 (i.e., the access end judgement section 12) judges whether a specified time has passed since the tracking vehicle 1 stopped tracking the operator S, and this judgement result enables the control unit 9 to reliably judge whether the operator S has ended access to the tracking vehicle 1.

The operator S is not in a vicinity of the tracking vehicle 1 when the operator has ended access to the tracking vehicle 1. In this embodiment, the control unit 9 (i.e., the access end judgement section 12) judges whether a distance between the tracking vehicle 1 and the operator S has been equal to or greater than the specified value C for the predetermined continuous time, and this judgement result enables the control unit 9 to reliably judge whether the operator S has ended access to the tracking vehicle 1.

The operator S is not in a vicinity of the shelves 14 when the operator S has ended pickup of items from the shelves 14. In this embodiment, the control unit 9 judges whether a distance between the operator S and the shelves 14 has been equal to or greater than the specified value D for the predetermined continuous time, and this judgement result enables the control unit 9 to reliably judge whether the operator S has ended access to the tracking vehicle 1.

In this embodiment, the control unit 9 (i.e., the brake control section 13) releases the service brake 4 when tracking of the operator S by the tracking vehicle 1 is suspended. This allows the operator S and the like to push the tracking vehicle 1 easily while tracking of the operator S by the tracking vehicle 1 is suspended. Accordingly, this prevents the tracking vehicle 1 from blocking the passage of operators even when the operator S accesses the tracking vehicle 1 in a narrow area.

The present disclosure is not limited to the above-described embodiment. For example, in the above-described embodiment, the control switch 6 for instructing the tracking vehicle 1 to start and end tracking the operator S is accompanied by the operator S. However, the tracking vehicle 1 may include such a control switch 6. Further, the tracking vehicle control system 5 may not include such a control switch 6. For example, powering the tracking vehicle 1 may activate the laser recognizer 8 to recognize the operator S to get the tracking vehicle 1 to start tracking the operator S.

In the tracking vehicle control system 5 according to the above-described embodiment, the laser recognizer 8 recognizes the operator S. However, instead of the laser recognizer 8, a sensor or a camera may recognize the operator S.

In the tracking vehicle control system 5 according to the above-described embodiment, the tracking vehicle 1 stops tracking the operator S automatically when the control unit 9 (i.e., the access start judgement section 11) judges that the operator S has started access to the tracking vehicle 1. However, the tracking vehicle 1 may stop tracking the operator S by instruction from an operator via a device such as a switch. In the tracking vehicle control system 5 according to the above-described embodiment, the tracking vehicle 1 restarts tracking the operator S automatically when the control unit 9 (i.e., the access end judgement section 12) judges that the operator S has ended access to the tracking vehicle 1. However, the tracking vehicle 1 may restart tracking the operator S by the instruction from an operator via a device such as a switch.

In the tracking vehicle control system 5 according to the above-described embodiment, the tracking vehicle 1 is a picking cart used for picking operation, and the operator S loads the picked items into the tracking vehicle 1. However, the present disclosure is not limited to picking operation. For example, the present disclosure may be applicable to a case where a tracking object accesses a tracking vehicle to operate a terminal device disposed on the tracking vehicle.

What is claimed is:

1. A tracking vehicle control system for controlling a tracking vehicle that tracks a tracking object, the tracking vehicle control system comprising:
    a motor configured to drive the tracking vehicle;
    a laser configured to irradiate the tracking object in order to recognize the tracking object; and
    a processor configured to:
    control the motor to drive the tracking vehicle to track the tracking object according to a result of recognition of the tracking object performed by the laser;
    judge that the tracking object has started access to the tracking vehicle, when a distance between the tracking vehicle and the tracking object is equal to or less than a first specified value for a predetermined continuous time, based on the result of recognition of the tracking object performed by the laser;
    control the motor to stop the tracking vehicle from tracking the tracking object when the tracking object has started access to the tracking vehicle, wherein the laser irradiates the tracking object even when tracking of the tracking object by the tracking vehicle is suspended;
    control the motor to cause the tracking vehicle to restart tracking the tracking object when the tracking object has ended access to the tracking vehicle,
    judge that the tracking object has ended access to the tracking vehicle, when a specified time has passed since the tracking vehicle stopped tracking the tracking object.

2. The tracking vehicle control system according to claim 1, wherein
    the processor is further configured to judge, according to the result of recognition of the tracking object performed by the laser, whether the distance between the tracking vehicle and the tracking object has been equal to or greater than a second specified value for restart of tracking for the predetermined continuous time, and when the specified time has not passed since the tracking vehicle stopped tracking the tracking object, judge that the tracking object has ended access to the tracking vehicle, when the distance between the tracking vehicle and the tracking object has been equal to or greater than the second specified value for the predetermined continuous time.

3. The tracking vehicle control system according to claim 1, wherein the processor is further configured to control a service brake of the tracking vehicle, so as to release the service brake when tracking of the tracking object by the tracking vehicle is suspended.

4. A tracking vehicle control system for controlling a tracking vehicle that tracks a tracking object, the tracking vehicle control system comprising:
a motor configured to drive the tracking vehicle;
a laser configured to irradiate the tracking object in order to recognize the tracking object; and
a processor configured to:
control the motor to drive the tracking vehicle to track the tracking object according to a result of recognition of the tracking object performed by the laser;
judge that the tracking object has started access to the tracking vehicle, when the tracking object has been within a predetermined area for a predetermined continuous time, based on the result of recognition of the tracking object performed by the laser;
control the motor to stop the tracking vehicle from tracking the tracking object when the tracking object has started access to the tracking vehicle, wherein the laser irradiates the tracking object even when tracking of the tracking object by the tracking vehicle is suspended;
control the motor to cause the tracking vehicle to restart tracking the tracking object when the tracking object has ended access to the tracking vehicle,
judge that the tracking object has ended access to the tracking vehicle when a specified time has passed since the tracking vehicle stopped tracking the tracking object.

5. The tracking vehicle control system according to claim 4, wherein
the processor is further configured to judge, according to the result of recognition of the tracking object performed by the laser, whether a distance between the tracking vehicle and the tracking object has been equal to or greater than a specified value for restart of tracking for the predetermined continuous time, and
when the specified time has not passed since the tracking vehicle stopped tracking the tracking object, judge that the tracking object has ended access to the tracking vehicle, when the distance between the tracking vehicle and the tracking object has been equal to or greater than the specified value for the predetermined continuous time.

6. The tracking vehicle control system according to claim 4, wherein the processor is further configured to control a service brake of the tracking vehicle, so as to release the service brake when tracking of the tracking object by the tracking vehicle is suspended.

* * * * *